United States Patent [19]
Hedges

[11] Patent Number: 5,498,372
[45] Date of Patent: Mar. 12, 1996

[54] ELECTRICALLY CONDUCTIVE POLYMERIC COMPOSITIONS

[75] Inventor: Winston L. Hedges, Livermore, Calif.

[73] Assignee: Hexcel Corporation, Pleasanton, Calif.

[21] Appl. No.: 195,399

[22] Filed: Feb. 14, 1994

Related U.S. Application Data

[63] Continuation-in-part of Ser. No. 930,738, Aug. 14, 1992, and a continuation-in-part of Ser. No. 972,574, Nov. 6, 1992.

[51] Int. Cl.$^6$ .................. H01B 1/12; H01B 1/24
[52] U.S. Cl. ............ 252/511; 252/502; 252/510; 106/472; 427/113
[58] Field of Search ................ 252/502, 510, 252/511; 106/472; 427/113

[56] References Cited

U.S. PATENT DOCUMENTS

| | | | |
|---|---|---|---|
| 3,807,977 | 4/1974 | Johnston et al. | 44/62 |
| 4,547,439 | 10/1985 | Genies | 429/105 |
| 4,629,540 | 12/1986 | Geniees et al. | 204/59 |
| 4,724,062 | 2/1988 | Naarmann et al. | 704/59 R |
| 4,738,757 | 4/1988 | Naarmann | 204/28 |
| 4,740,436 | 4/1988 | Kobayashi et al. | 429/194 |
| 4,749,451 | 6/1988 | Naarmann | 204/58.5 |
| 4,772,422 | 9/1988 | Hijikata et al. | 252/511 |
| 4,798,685 | 1/1989 | Yaniger | 252/500 |
| 4,803,138 | 2/1989 | Kobayashi et al. | 429/194 |
| 4,806,271 | 2/1989 | Yaniger et al. | 252/500 |
| 4,822,638 | 4/1989 | Yaniger | 427/79 |
| 4,824,745 | 4/1989 | Ogawa et al. | 429/213 |
| 4,851,487 | 7/1989 | Yaniger et al. | 525/540 |
| 4,855,361 | 8/1989 | Yaniger et al. | 525/436 |
| 4,889,659 | 12/1989 | Genies | 252/500 |
| 4,935,163 | 6/1990 | Cameron | 252/500 |
| 4,937,060 | 6/1990 | Kathirgamanathan et al. | 428/403 |
| 4,940,517 | 7/1990 | Wei | 204/78 |
| 4,983,690 | 1/1991 | Cameron et al. | 524/436 |
| 4,986,886 | 1/1991 | Wei et al. | 204/78 |
| 4,994,783 | 2/1991 | Yaniger | 338/308 |
| 5,000,041 | 4/1991 | Cameron et al. | 252/500 |
| 5,023,149 | 6/1991 | MacDiarmid et al. | 429/27 |
| 5,069,820 | 12/1991 | Jen et al. | 252/500 |
| 5,076,920 | 12/1991 | Danowski et al. | 210/243 |
| 5,093,439 | 3/1992 | Epstein et al. | 525/540 |
| 5,102,012 | 4/1992 | Foster | 222/40 |
| 5,143,650 | 9/1992 | Gerace et al. | 252/511 |
| 5,160,457 | 11/1992 | Elsenbaumer | 252/500 |
| 5,207,949 | 5/1993 | Niino et al. | 252/511 |

FOREIGN PATENT DOCUMENTS

| | | |
|---|---|---|
| 62-064828 | 4/1987 | Japan . |
| 62-064828A | 4/1987 | Japan . |
| 01022984A | 1/1989 | Japan . |
| PCTWO89/01694 | 2/1989 | WIPO . |

OTHER PUBLICATIONS

English Translation of Japanese Document No. J62064828A (which was transmitted to the U.S. Patent Office on Nov. 16, 1992).

Copy of International Search Report in International Application No. PCT/US93/06494 Sep. 8, 1993.

*Primary Examiner*—Christine Skane
*Assistant Examiner*—Gregory R. Del Cotto
*Attorney, Agent, or Firm*—Poms, Smith, Lande & Rose

[57] ABSTRACT

Electrically conductive polymeric compositions suitable for fabricating devices for safely transporting volatile chemicals and fuels are disclosed. The electrically conductive polymeric compositions include at least one matrix polymer and an electrically conductive filler material incorporated in the matrix polymer in an amount sufficient to provide the conductive polymeric composition with an electrical conductivity of at least $10^{-10}$ S/cm. The electrically conductive filler material is intrinsically conductive polymer coated carbon black particles. The coating of intrinsically electrically conductive polymer provides a protective shield against loss of particle conductivity, contributes to the overall conductivity of the filler material and enhances the mechanical properties of the filled matrix polymer.

12 Claims, No Drawings

ELECTRICALLY CONDUCTIVE POLYMERIC COMPOSITIONS

This is a continuation-in-part of applications Ser. Nos. 07/930,738, filed Aug. 14, 1992, and 07/972,574, filed Nov. 6, 1992.

BACKGROUND OF THE INVENTION

1. Field of the Invention

The present invention relates generally to electrically conductive polymeric compositions. More particularly, the present invention involves a polymeric matrix material incorporating a filler of intrinsically conductive polymer coated carbon particles useful for fabricating devices capable of long term electrical charge dissipation.

2. Description of Related Art

Organic polymers are generally good insulators and have a high value of specific resistance. Materials having these insulating characteristics, such as plastic devices and polymeric films and powders, accumulate electrostatic charges which can produce sparks and potentially cause explosions and fires in certain environments. A particularly troublesome source of accumulated surface charge occurs as the result of friction created between moving surfaces. The static charge build-up can occur between moving fluids in contact with other materials, either liquids or solids. Thus, for example, when fuels or other volatile chemicals are transported through lines of insulating material, large surface voltages can build-up on the chemical and the insulating material. Under some circumstances, the material or fuel can discharge its energy to ground in a spark capable of igniting any volatile material in the surrounding environment. Additionally, the static potential can be high enough to actually cause a discharge through a chemical transport line, for example, a fuel line, creating a pinhole. Sparking caused by subsequent charging can ignite fuel or volatile material leaking through the pinhole with catastrophic results.

Since it is not practical to prevent the friction which causes the charge generation, remedial measures for decreasing the possibility of fires and explosions are based on increasing the rate of charge dissipation or charge leakage so that charge build-up does not occur. Along these lines, one approach is to utilize inherently electrically conductive materials such as metals to fabricate fuel lines. However, due to weight, flexibility and cost considerations transport lines fabricated from polymeric materials are preferred.

A more commonly utilized approach is to utilize polymers or polymeric compositions incorporating electrically conductive filler materials to fabricate chemical transport lines which are electrically conductive.. The incorporation of conductive filler material into polymer formulations increases the electrical conductivity of the whole polymeric material. The overall function of conductive filler material involves decreasing the rate of charge generation or increasing the rate of charge dissipation, or both mechanisms. Thus, the conductive nature of these polymers and polymeric compositions contributes to the prevention of possible catastrophic explosions and fires during the transport of volatile fuels and chemicals.

Common electrically conductive filler materials utilized to impart electrical conductivity to polymers include carbon based particles. Carbon black in particular is widely utilized by polymer compounders to vary the electrical characteristics of polymers. By selecting suitable carbon black filler and carefully formulating the carbon black with an appropriate polymer, a wide range of conductive polymeric compositions can be fabricated. Typically, finished polymeric products can be made electrically conductive by effectively dispersing carbon filler into the polymer prior to fabricating the finished product. With respect to electrically conductive chemical transport lines, carbon black of varying graphitic structure is incorporated into a suitable polymer, for example nylon. Then, the resulting electrically conductive formulation is generally extruded into an appropriately sized conduit.

One problem associated with carbon filled polymeric materials relates to the propensity of the surfaces of particles of carbon black to adsorb or otherwise react with their environment. When conductive carbon fillers are dispersed in polymeric chemical transport lines, the chemicals and additive components of the polymer interact with the surface of the carbon black filler particles. Once a sufficient amount of the chemical or additive adsorbs or reacts, the surface of the carbon filler becomes non-conductive. This in turn results in a non-conductive polymeric composition which is susceptible to failure and is potentially a serious safety hazard when used to transport chemicals.

Another problem with carbon filler material involves the catalytic characteristics of carbon surfaces. In certain systems carbon surfaces may catalyze reactions between the surrounding polymer matrix and an adsorbed substance leading to mechanical weakening of the chemical transport line.

Accordingly, it is an object of the present invention to provide electrically conductive polymeric compositions useful for fabricating devices having long term electrical conductivity characteristics.

It is additionally an object of the present invention to provide an electrically conductive carbon filled polymeric composition which maintains its conductive properties and mechanical integrity after exposure to reactive and hostile environments.

SUMMARY OF THE INVENTION

The present invention accomplishes the above-described objectives by providing electrically conductive carbon filled polymeric compositions which maintain their conductivity and mechanical integrity in the presence of a variety of chemically reactive and hostile environmental conditions. Since the polymeric compositions of the present invention are able to retain their electrical conductivity and their long term ability to decrease static charge generation and increase charge dissipation in the presence of chemicals, they are particularly suitable for the fabrication of chemical transport devices including conduits, filters, and valving. Thus, the practice of the present invention provides methods and apparatus for significantly improving the safe handling and transport of volatile fuels and chemicals.

More particularly, the present invention provides electrically conductive polymeric compositions which include at least one matrix polymer and an electrically conductive filler material incorporated in the matrix polymer in an amount sufficient to provide the organic polymeric composition with an electrical conductivity of at least $10^{-10}$ S/cm. The electrically conductive filler material is intrinsically electrically conductive polymer coated carbon black particles. For purposes of the present invention the term conductive polymer, as used herein, means polymers which are intrinsically electrically conductive. Preferred exemplary conductive polymeric compositions include conductive polyaniline coated carbon particles incorporated in a nylon matrix. These preferred compositions are particularly suitable for the fabrication of chemical transport lines as the coating of electrically conductive polymer protects the surface of the carbon black particles from the detrimental effects of exposure to chemicals and fuels. Additionally, the conductive polymer contributes to the overall conductivity of the polymeric composition by electrically interacting with the carbon black particles.

The electrically conductive polymeric compositions of the present invention are prepared by first providing conductive polymer coated carbon black particles and then incorporating the coated carbon particles into a matrix polymer or prepolymer to provide a conductive polymeric composition. Those skilled in the art will appreciate that incorporating the coated carbon particles into the matrix polymer can be accomplished by any of a number of methods and depends upon the nature of the matrix polymer and the intended application of the conductive polymeric composition. In the case of preparing thermoset polymers, the conductive polymer coated carbon particles are generally incorporated in the matrix resin or prepolymer prior to finally curing the resin or prepolymer. Preparing conductive thermoplastic compositions typically involves blending coated carbon black particles into the thermoplastic polymer at blend temperatures to form a homogeneous coated carbon particle filled conductive thermoplastic polymeric composition which can be further heat processed.

Conductive polymer coated carbon black particles can be prepared by forming a solution of the appropriate conductive polymer and then adding carbon black to the polymer solution. Adding water or other non-solvent to the mixture of carbon black and polymer solution causes the conductive polymer to precipitate onto the surface of the carbon black particles. An alternative method involves synthesizing the conductive polymer in a reaction mixture which incorporates the carbon black particles so that the polymer forms simultaneously with the coating process.

Further objects, features and advantages of the conductive polymeric compositions of the present invention, as well as a better understanding thereof, will be afforded to those skilled in the art from a consideration of the following detailed explanation of preferred exemplary embodiments thereof.

DETAILED DESCRIPTION OF EXEMPLARY EMBODIMENTS

The polymeric compositions of the present invention have utility in applications in which conductive polymeric compositions are required or preferred due to their ability to conduct electricity. The nature of these applications varies widely and includes conductive polymeric adhesives used in the electronic industry, battery electrodes, and deterrents to static charge accumulation such as conductive polymeric fibers used in the textile industry.

The conductive polymeric compositions of the present invention maintain their electrical conductivity even after long term exposure to hostile reactive environments. For this reason, they are particularly suitable for the fabrication of chemical transport lines and chemical transport filters where the electrically conductive nature of the polymeric compositions prevents potentially dangerous charge accumulation caused by friction between transported chemical fluids and the transport line.

The present invention is based upon the discovery that carbon black particles which are widely used as electrically conductive filler material for polymers can be coated with a thin coating of intrinsically conductive polymer without losing their conductive characteristics. Moreover, unlike uncoated carbon black particles which are prone to conductive failure, the coated carbon particles utilized in the present invention can be exposed to chemicals and fuels without adversely affecting their ability to conduct electricity. It is believed that the conductive polymer coating electrically interacts with the carbon particle while providing a protective barrier to environmentally induced changes in the surface of the carbon particle. In the absence of the conductive polymeric coating, the surfaces of the carbon particles eventually lose their conductivity and cause the conductive failure of the conductive polymer composition.

As a general rule the conductivity of carbon black particles increases with an increase in surface area corresponding to an increase in fine structure of the carbon particle. Thus highly structured carbon black particles are preferred for charge dissipation as they tend to be more highly conductive. Unfortunately increasing structure in carbon black particles tends to significantly increase the viscosity of resin matrices in which the particles are dispersed, often to such a degree that highly structured particles cannot be used as filler material at greater than minimal concentrations.

As a feature of the present invention, intrinsically conductive polymer coated carbon black particles retain the finely structured dimensional properties and high surface areas of carbon black particles which make them effective filler material for a variety of polymers. As mentioned above, where their fine structure would normally lead to increased viscosities during the processing of carbon particle filled polymeric compositions, conductive polymer coated carbon black particles can be incorporated into polymeric matrix materials at higher than previously attainable loadings while maintaining advantageously low viscosities. Alternatively, the conductive polymeric compositions of the present invention can be fabricated with conventional amounts of filler material and polymer matrix with a resulting decrease in composition viscosity. This may be due to filling much of the spaces in the particle with conductive polymer such that the particle presents a smoother surface to the matrix resin while still retaining the fine structure of the carbon black particle.

Accordingly, the present invention provides electrically conductive polymeric compositions which include at least one matrix polymer and incorporated in the matrix polymer electrically conductive filler material in an amount sufficient to provide the polymeric composition with an electrical conductivity of at least $10^{-10}$ S/cm. The electrically conductive filler material is intrinsically electrically conductive polymer coated carbon black particles, with the conductive polymer forming approximately 5 wt % to 50 wt % of the filler material. Exemplary conductive polymeric compositions include from about 0.5 wt % to about 60 wt % conductive filler material.

The carbon black particles utilized in the compositions of the present invention are preferably in the form of discrete uniformly sized particles each of which has a thin coating of conductive polymer. That is, aggregates of carbon black particulates are preferably minimized and the processes described herein for producing coated carbon particles provide relatively few numbers of coated aggregates of carbon particulates. However, it is expected that a certain number of coated carbon black particles will exist in the form of coated aggregates of carbon black particulates. Thus, for purposes of the present invention, coated aggregates of carbon particles in which more than one discrete carbon particulate forms an aggregate which itself has a thin coating of conductive polymer are within the definition of coated carbon black particles.

Additionally, the conductive polymer coating is thin, which, as mentioned above, is preferably approximately 5 wt % to approximately 50 wt % of the weight of the filler material. The thin conductive polymer coating formed by the methods described herein allows the filler material to retain the bulk electrical characteristics of the uncoated carbon black particles. Thus, in accordance with the present invention, the conductive polymer coating serves largely as a protective electrical interconnection between the surrounding polymer matrix and the carbon black particle.

Suitable forms of carbon particles include carbon black particles of varying graphitic content, size, morphology and shape. Such carbon black particles are widely available from commercial sources such as Degussa Corporation and Cabot. Particle sizes are generally in the sub-micron range and these particles have aspect ratios as high as 1 to 100. Additionally the surface areas of carbon black black particles having utility in the present invention are typically at least 200 m²/gram and as high as 2000 m²/gram. Those skilled in the art will appreciate that carbon black particles have physical and electrical conductivity properties which are primarily determined by the structure, particle size, morphology and surface chemistry of the particle.

More particularly, carbon black particle structures can range from highly structured tree-like shapes to minimally structured rod-like shapes. Typically, the conductivity of carbon black particles increases with increases in the structure of the particle from low structure to fine structure. Associated with the increase in structure is an increase in surface area which also increases conductivity. Similarly, the conductivity of highly crystalline or highly graphitic particles is higher than the conductivity of the more amorphous particles. Generally speaking, any of the above-described forms of carbon black particles is suitable in the practice of the present invention and the particular choice of size, structure, and graphitic content depends upon the physical and conductivity requirements of the coated carbon black particle.

It is contemplated as being within the scope of the present invention to provide carbon black particles having a coating of any of a large variety of intrinsically conductive polymers. Polymers having the capability of conducting electricity are documented in the literature, having been studied extensively during the past decade. A useful review article which discusses the synthesis and physical, electrical, and chemical characteristics of a number of conductive polymers is *Conductive Polymers*, Kanatzidis, M. G., C & E News, 36–54, Dec. 3, 1990. Some of the more useful classes of conductive polymers include unsaturated or aromatic hydrocarbons as well as nitrogen, sulfur, or oxygen containing compounds. The polymers include but are not limited to conductive forms of polyacetylene, polyphenylene, polyphenylenevinylene, polypyrrole, polyisothianaphthene, polyphenylene sulfide, polythiophene, poly(3-alkylthiophene), polyazulene, polyfuran, and polyaniline. For purposes of the present invention, conductive forms of polyaniline are preferred for forming the coating of conductive polymer. These conductive forms include self-doped, sulfonated polyaniline which is conductive without external doping.

Polyaniline can occur in several general forms including a reduced form having the general formula

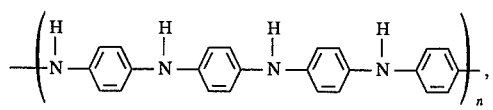

a partially oxidized form having the general formula

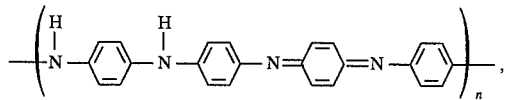

and the fully oxidized form having the general formula

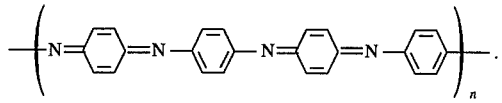

Each of the above illustrated polyaniline oxidation states can exist in its base form or in its protonated form. Typically, protonated polyaniline is formed by treating the base form with protonic acids, such as mineral and/or organic acids. The electrical properties of polyaniline vary with the oxidation states and the degree of protonation, with the base forms being generally electrically insulating and the protonated form of polyaniline being conductive. Accordingly, by treating a partially oxidized base form of polyaniline, a polymer having an increased electrical conductivity of approximately 1–10 S/cm is formed.

The preparation and properties of polyaniline, both its non-conductive or "free base" form and its conductive "acid" form, are well documented in the literature. For example, U.S. Pat. Nos. 5,008,041, 4,940,517, 4,806,271, disclose methods for preparing polyaniline under a variety of conditions for obtaining different molecular weights and conductivities. Typically, polyaniline is prepared by polymerizing aniline in the presence of a protonic acid and an oxidizing agent resulting in the "acid" protonated conductive form of the polymer.

Protonic acids having utility in the synthesis of polyaniline include acids selected from the group consisting of HX, $H_2SO_4$, $H_3PO_4$, $R(COOH)_n$, $R'(COOH)_n$, $R(SO_3H)_n$, $R(PO_3H)_n$, $R'(SO_3H)_n$, $R'(PO_3H)_n$, wherein X is a halogen, R is hydrogen or a substituted or unsubstituted alkyl moiety, R' is a substituted or unsubstituted aromatic moiety, and n is an integer $\geq 1$. Exemplary acids include methane sulfonic acid, benzene sulfonic acid, toluene sulfonic acid, or acids having the formula $HO_3SR'$—O—$R''SO_3H$ wherein R' and R'' are independently substituted or unsubstituted aromatic moieties. Substitutions for the aromatic moieties include halogen, alkyl, or alkoxy functionalities.

As described in more detail below, in the practice of the present invention it may be preferable to prepare polyaniline with a protonic acid having the formula

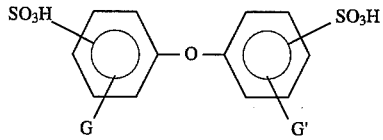

wherein G and G' are independently hydrogen, lower alkyl, octyl, nonyl, or saturated or unsaturated linear or branched decyl, dodecyl, tetradecyl, hexadecyl, or octadecyl groups. Protonic acids belonging to this general class of compounds have surfactant properties which aid in dispersing and deaggregating carbon particles. Exemplary protonic acids having surfactant properties are, selected from the group consisting of decyl diphenylether disulfonic acid and decylphenylether disulfonic acid.

Generally, the counter-ion of the protonated conductive polyaniline is supplied by the protonic acid utilized in the polymerization. Accordingly, the counterion can be selected from a large number of ions including the anions of the aforementioned protonic acids. The nonconductive form of polyaniline can be prepared by deprotonating the doped conductive form, for example, by dissolving or slurrying the polymer in ammonium hydroxide solution, to form nonconductive polyaniline free base.

It is further contemplated as being within the scope of the present invention to utilize sulfonated polyaniline compositions having the following general formula:

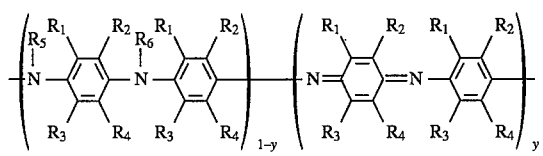

wherein $0 \leq y \leq 1$; $R_1$, $R_2$, $R_3$, $R_4$, $R_5$, $R_6$ are selected from the group consisting of H, $-SO_3^-$, $-SO_3H$, $-R_7SO_3^-$, $-R_7SO_3H$, $-OCH_3$, $-CH_3$, $-C_2H_5$, $-F$, $-Cl$, $-Br$, $-I$, $-NR_7$, $-NHCOR_7$, $-OH$, $-O^-$, $-SR_7$, $-OR_7$, $-OCOR_7$, $-NO_2$, $-COOH$, $-COOR_7$, $-COR_7$, $-CHO$, and $-CN$, wherein $R_7$, is a $C_1-C_8$ alkyl, aryl or arylalkyl group. Furthermore, the fraction of rings containing at least one $R_1$, $R_2$, $R_3$, or $R_4$ groups as $-SO_3^-$, $-SO_3H-$, $R_7SO_3^-$, or $-R_7SO_3H$ can be varied from a few percent to one hundred percent. The solubility of the sulfonated polyaniline is varied by changing the degree of sulfonation. In fact the solubility of polyaniline is increased in basic aqueous solution by the presence of $SO_3H$ groups on the phenyl rings. Also the oxidation state of the polymer and the degree of sulfonation can be independently varied.

The synthesis of sulfonic acid ring-substituted polyaniline, or self-doped sulfonated polyaniline, is reported in an article entitled *Synthesis of Self-Doped Conducting Polyaniline*, Yue et al., J. Am. Chem. Soc, 2800– 2801, 1990 which is herein incorporated by reference. Briefly, sulfonated polyaniline is prepared by converting polyaniline to its more soluble nonconductive emeraldine base form and dissolving the base form in fuming sulfuric acid. Then, after 2 hours of constant stirring at room temperature, slowly adding the solution to methanol at a temperature of between 10° C. to 20° C. causes sulfonated polyaniline to precipitate.

It is contemplated to be within the scope of the present invention to provide methods for preparing coated carbon black particles by forming conductive polymer in a reaction mixture which additionally includes carbon black particles. The amount of carbon black particles in the reaction mixture is sufficient to provide each of the carbon black particles with a coating of from approximately 5 wt % to 50 wt % conductive polymer. As previously mentioned, the carbon black particles are preferably in the form of discrete unaggregated particles. However, aggregates of carbon black particulates are fully within the definition of carbon black particles for purposes of the present invention.

Conductive polymer coated carbon black particles can be prepared utilizing in situ methods by forming conductive polymer in a reaction mixture which incorporates carbon black particles in an amount sufficient to provide each of the carbon black particles with a coating of from approximately 5 wt % to 50 wt % conductive polymer. Then separating the coated black carbon black particles from the reaction mixture provides an electrically conductive composition. When polyaniline is the selected conductive polymer the coating process is accomplished by forming a slurry of deaggregated and wetted carbon black particles in a reaction mixture of a solution of solvent, protonic acid, aniline, and other additives such as suitable oxidants. Preferably, the reaction mixture also includes dianiline in an amount sufficient to provide the desired polyaniline molecular weight according to known polyaniline synthetic methods. As conductive polyaniline forms it coats the surface of the carbon black particles, slowly growing a thin, adherent conductive coating. Typically the polymerization process occurs at temperatures between −10°–80° C. Once collected and washed the coated particles are suitable for incorporating into a suitable resin or matrix material as filler material, forming a conductive polymeric composition.

A variety of protonic acids are suitable for forming acidic solutions and/or protonating polyaniline and include the aforementioned protonic acids useful in polyaniline synthesis and doping nonconductive polyaniline to form conductive polyaniline. Advantageously, protonic acids having surfactant properties are useful for prewetting and deaggregating carbon black. Thus, these surfactant protonic acids combine in their function as a surfactant and reactive acid in the above-described process. As previously mentioned, protonic acids belonging to this general class of compounds include decyl diphenylether disulfonic acid and decylphenylether disulfonic acid. Similarly, a variety of oxidants are suitable for incorporating into the reaction mixture and include ammonium persulfate, inorganic chlorates, inorganic chromates, and peroxides.

Alternatively, carbon black particles can be coated with conductive polymer by first forming a mixture of deaggregated carbon black particles in a solution of polymer and then causing the polymer to precipitate onto the carbon black particle by adding water or other non-solvent for the polymer to the mixture. The coated carbon particles are then suitably collected, washed and dried. Typically, when polyaniline is the polymer of choice, the solution of polymer is a solution of free-base polyaniline in its undoped form. Accordingly, following the coating step the coated particles are converted to a conductive form by generating a coating of conductive polymer. This doping step is accomplished by forming a slurry of the coated carbon black particles and aqueous solution of dopant. Suitable dopants are those protonic acids already mentioned which are useful in the synthesis of polyaniline.

A preferred method for coating carbon black particles with polyaniline includes first deaggregating carbon black particles by stirring carbon particles in a suitable aqueous surfactant to form a slurry of carbon black particles. Suitable surfactants include any of a variety of ionic and nonionic surfactants as known in the art. Preferred surfactants are those which are additionally suitable in the polymer synthesis and as dopants for the conductive polymer. These preferred surfactants include long chain alkyl substituted sulfonic acids such as those protonic acids having the formula

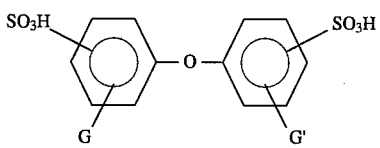

wherein G and G' are independently hydrogen, lower alkyl, octyl, nonyl, or saturated or unsaturated linear or branched decyl, dodecyl, tetradecyl, hexadecyl, or octadecyl groups. Protonic acids belonging to this general class of compounds have surfactant properties which aid in dispersing and deaggregating carbon black particles. Exemplary protonic acids are selected from the group consisting of decyldiphenylether disulfonic acid and decylphenylether disulfonic acid.

Subsequent process steps include pre-wetting carbon black particles in an aqueous solution of protonic acid, combining aniline and dianiline with the wetted carbon black particles, cooling the slurry and adding an appropriate oxidant. The polymer forms in the presence of the carbon black particles and the polymer material actually coats the carbon black as the polymer forms. During the work-up step the carbon particles are collected, washed, and dried resulting in coated carbon black particles having a coating of from about 5 wt % to about 50 wt % conductive polyaniline.

An alternate method for coating carbon black particles with conductive polyaniline includes dissolving soluble free base polyaniline in a suitable solvent such as N-methyl pyrrolidinone, formamide, dimethylformamide or dimethylsulfoxide, forming a slurry of carbon black particles and then causing the dissolved polymer to precipitate onto the carbon particles. Typically water is added to the slurry to cause the precipitation. However, other non-solvents for the polymer are effective for precipitating the polymer. The coated carbon black particles are then dispersed in an aqueous solution of protonic acid as described above to produce the conductive acid-doped form of polyaniline.

In accordance with the present invention, when self-doped sulfonated polyaniline is the conductive polymer of choice, the preferred method for preparing coated carbon black particles involves dissolving sulfonated polyaniline in an aqueous base to form a polymer solution, adding carbon black particles to form a slurry and then causing the polymer to precipitate onto the surface of the carbon particles. The preferred aqueous base is aqueous ammonia or ammonium hydroxide. However, other suitable aqueous bases include aqueous solutions of metal hydroxides having the formula:

$M(OH)_n$, wherein M is a metal having charge n, and n is an integer $\geq 1$;

compounds having the formula:

(NRR'R"R''')OH wherein R, R', R", R''' are independently H, alkyl, or aryl functionalities; and compounds having the formula:

NRR'R"

wherein R, R', R" are independently H, alkyl, or aryl functionalities.

Typically, precipitating the polymer is accomplished by changing the pH of the polymer solution. More particularly, the pH of the aqueous system is caused to decrease causing the polymer to precipitate. Those skilled in the art will appreciate that adding a protonic acid to the aqueous system will cause the sulfonated polyaniline to precipitate. When aqueous ammonia or a volatile amine is the aqueous base, a preferred method for changing the polymer solution pH includes heating the polymer solution. This causes the base to leave the solution with a resulting drop in pH. Exposing the polymer solution to a vacuum aids the pH lowering process by causing the volatile amine to be more completely removed from the system.

Alternatively, carbon black particles having a coating of sulfonated polyaniline may be prepared using in situ methods similar to those discussed above. An exemplary method includes polymerizing amino-benzene sulfonic acid in 1M HCl in the presence of a suitable oxidant and carbon black. As the polymer chain develops the polymer grows on and/or precipitates from solution onto the surface of the carbon black particles, forming a thin coating of conductive polymer.

In accordance with the present invention and independent of the method selected for preparing coated carbon black particles, the carbon particles are preferably dispersed and relatively free of aggregates. Alternatively, aggregates which are present are small enough to maintain the structural and conductive characteristics of particles. Those skilled in the art will appreciate that once provided with a thin coating of conductive polymer, carbon black particles having the least amount of aggregates are less likely to shear or break into a significant number of particles having exposed uncoated portions of carbon. The coating of conductive polymer protects the particle from conductive failure and provides other chemical and physical advantages. Accordingly, uncoated portions of aggregates or particles are preferably avoided.

Suitable methods for deaggregating carbon black particles include mechanical and ultrasonic dispersion techniques which are typically performed with the carbon black dispersed in aqueous systems containing a surfactant. Thus, for example, carbon particles having a coating of conductive polyaniline can be prepared by dispersing carbon black particles in an aqueous solution of TRITON X-100 available from Rohm & Haas. Then, following the effective deaggregation of the carbon particles, a protonic acid, such as aqueous p-toluene sulfonic acid, aniline and/or dianiline and oxidant is charged into the dispersed carbon black mixture wherein the polymer forms on and/or precipitates onto the carbon black particles.

In a preferred method for deaggregating and coating carbon black particles utilizing methods which involve in situ polymerization processes, a disulfonated alkyl diphenyl ether provides both the surfactant properties and the acidic medium for the polymerization. An exemplary surfactant in this class of compounds is n-decyldiphenyl ether disulfonic acid, available from PILOT Chemical Co. This compound has two sulfonic acid groups per molecule and at least one ten member hydrocarbon chain per molecule.

In accordance with the present invention, when coated carbon black particles are prepared by polymerizing aniline in the presence of carbon black particles, the coated carbon particles generally have a greater conductivity than precipitating free-base polyaniline onto carbon black particles from a solution of the polymer and then re-doping the free-base polyaniline to form conductive polymer coated carbon black particles. Moreover, when free-base polyaniline is precipitated onto carbon black particles from a solution of polyaniline and then re-doped, the conductivity of the resulting coated carbon black particles is greater than the conductivity of material formed by merely combining neat conductive polyaniline and carbon black particles and pressing the combination into a pellet. This phenomenon indicates that the greatest interaction between the polymer and the carbon black particle occurs when the carbon is coated during the polymerization reaction. Similarly, a greater physical, chemical and electrical interaction between the conductive polymer and the carbon black particle occurs when the polymer is precipitated onto the surface of carbon as compared to merely mixing conductive polymer and carbon black particles.

In view of the greater physical and chemical interactions which develop between the conductive polymer coating and carbon black particle formed by in situ polymerization techniques, in situ preparation methods are preferred. Additionally, when highly structured dendritic forms of carbon black are utilized, in situ polymerization techniques tend to preserve the fine tree-like structure in the final filler material. This is believed to occur because the polymer actually grows on the surface of the fine structure as opposed to being quickly adsorbed by precipitation techniques. The slow deposition of polymer during in situ polymerization coating methods results in a more orderly polymer. Since ordering in conductive polymers is directly related to increased conductivity, the in situ polymerization deposition results in a higher bulk conductivity of the carbon black particles. Furthermore, the in situ polymerization methods directly provide doped conductive polyaniline coating. This is in contrast to coatings formed during solvent precipitation methods which require further doping procedures in order to regenerate the conductive form. These final doping procedures frequently do not form fully doped polymer to provide maximum conductivity for the composition.

As mentioned above, the protonated conductive form of polyaniline incorporates a counter-ion which is typically supplied by the acid utilized in the polymerization process or by the protonic acid utilized for converting the free base polyaniline to the protonated polyaniline. Connected with the choice of counter-ion of the conductive acid form is an associated conductivity of the polyaniline. However, surprisingly, the conductivity of carbon particles having a coating of conductive polyaniline does not necessarily parallel the performance of the conductive polymer alone. For example, polyaniline mesylate has a conductivity of approximately 10–20 S/cm and polyaniline tosylate has a conductivity of approximately 3 S/cm. Conversely, carbon particles having a coating of approximately 20 wt % polyaniline tosylate formed in situ during the aniline polymerization in accordance with the present invention have a conductivity of about 30 S/cm. Carbon black particles having a coating of approximately 20 wt % polyaniline mesylate have a conductivity of about 24 S/cm. Thus, by selectively choosing the counter-ion associated with conductive polyaniline, it is possible to tailor the conductivity of the resulting coated carbon black particle.

In accordance with the present invention the amount of conductive polymer formed on the surface of the carbon black particles is preferably the minimum amount necessary to provide a thin coating. Those skilled in the art will appreciate that less conductive polymer is necessary to provide a thin coating on each particle of a relatively low surface area conductive carbon black than the amount necessary to provide a thin coating on each particle of relatively high surface area carbon black. In fact, the weight percent of conductive polymer to the total weight of the coated particle can vary from perhaps 5% to 50% or even higher. However, excessively thick coatings may detract from the desirable properties of the carbon black. Thus, carbon black particles having a surface area of about 250 $m^2/gm$ (XC-72 from Degussa Corp.) demonstrate good physical properties when provided with a thin conductive polymer coating which is approximately 20% of the weight of the total particle. However, carbon black particles having a surface area of about 1000 $m^2/gm$ (XE-2 from Degussa Corp.) are not well coated at this percentage because of their much higher surface area. In the case of carbon black particles having a surface area of 1000 $m^2/gm$ a coating weight which is equivalent to the weight of the carbon particle provides adequate coverage.

Molecular surface area calculations can be performed to estimate the amount of polymer required to cover carbon black particles having any given surface area. However, the results are only a guide due to the assumptions which go into the calculations. Another technique for measuring the quality of the polymer coating involves pressing a pellet of coated carbon black particles after heating the coated carbon particles to 160° C. for 30 minutes. If a pellet forms by pressing at approximately 10,000 psi and the pellet is not easily destroyed by handling, then the quality of the coating is indicated as good. Pure carbon is not pelletized under these conditions.

The above-described evaluation technique is additionally useful for testing the conductive composition of the present invention for its heat stability. This is particularly important for compositions used as filler in polymers exposed to high temperature environments. For example XE-2 carbon black particles having a surface area of about 1000 $m^2/gm$ with a 20 wt % coating will form a pellet at room temperature. This pellet is stable to mechanical manipulation. However, if the coated carbon is heated to 160° C. –200° C. for 30 minutes and then pressed into a pellet, the pellet cracks easily and has little physical integrity. Apparently, the coating sinters at high temperatures and pools into carbon black particle pores, thus reducing the amount of polymer on the exterior surfaces of the particle. However when these high surface area carbon black particles are coated to a 50 wt % coating, the resulting conductive composition forms a strong pellet when subjected to the same conditions. It should be noted that even at these high coating levels the amount of conductive polymer in the composition is still substantially less than that typically used in a battery composition.

Those skilled in the art will recognize that the above described conductivity properties of coated carbon black particles formed in accordance with the present invention indicate the presence of significant interactions between the conductive polymer and the carbon particles. That is, the overall conductivity of the electrically conductive compositions of the present invention is clearly a function of the combination of conductive polymer coating and the carbon black particles. If presynthesized conductive polyaniline tosylate is merely mixed with carbon black particles at a ratio of 20 wt % polymer and 80 wt % carbon black the conductivity is only about 13 S/cm. This is notably less than the 30 S/cm associated with carbon particles having a coating of polyaniline tosylate formed during the actual polymerization of aniline. This is further evidence of the interaction between the conductive polymer coating and the carbon black particles.

Those skilled in the art will appreciate that in addition to being dependent upon the amount and type of conductive polymer coating on the surface of the carbon black particles, the conductivity of the compositions of the present invention is dependent upon the shape, size and morphology of the carbon black particles. As discussed above, more highly structured graphitic carbon black particles having dendritic shapes and high surface area are typically the most conductive forms. Similarly, coated carbon black particles prepared from the more conductive forms of carbon black are typically more highly conductive than filler prepared from particles having little structure and low graphitic content.

Matrix polymers having utility in the conductive polymeric compositions of the present invention include any polymer or resin material which is benefitted by incorporating carbon particles in the polymer. Because filler material fabricated according to the present invention can be incorporated in polymers without acidic "out-gassing" or chemical interaction with the polymer and polymer additives, a variety of chemically diverse polymers has utility in the practice of the present invention. Exemplary embodiments include thermoset polymers such as epoxies and crosslinking insoluble polymers such as silicones. Particularly useful are thermoplastics such as polyethylene, ethylene vinylacetate, polystyrene, polypropylene, polyvinylchloride, polyetheramides, polyurethanes, acrylonitrile butadiene styrene and nylons. For purposes of providing electrically conductive polymeric compositions for forming chemical transport lines suitable matrix polymers include nylons, polyethylene, polypropylene, polyvinylchloride, polyetheramides, polyetherimides, polyethersulfones, polyetherketones, teflons, polyesters, acrylonitrile butadiene styrene, and polyurethanes.

Filler material of conductive polymer coated carbon particles prepared according to the disclosure herein can be incorporated into selected polymers or prepolymers utilizing methods known within the industry. By combining a selected amount of prepared filler material with a selected amount of suitable matrix polymer, an electrically conductive polymeric composition is formed. Extruding or molding the electrically conductive polymeric composition into a final product provides a formed conductive article, which in the absence of the filler is non-conductive. The amount of filler material incorporated into the organic polymer or prepolymer is a function of the selected polymer, the desired conductivity of the final conductive polymeric composition and the preferred physical properties of the composition.

More particularly, those skilled in the art will appreciate that for any given loading of carbon black particles compounded polymeric compositions based on different polymers will have different electrical properties. A variety of factors influence these properties including polymer rheology, the ability of the polymer to wet the carbon surface, polymer crystallinity, and the specific resistance of the polymer. Highly viscous and elastic polymers influence the ability of the filler material to disperse in the polymer. More crystalline polymers such as polypropylene tend to be more conductive and require less filler material than amorphous polymers such as polystyrene.

In accordance with the present invention, the same basic principles apply to fabricating and formulating electrically conductive polymeric compositions of the present invention. However, unlike prior art carbon particle filled compositions, which typically have high viscosities at relatively low carbon particle content, the compositions of the present invention are capable of higher coated carbon particle content without a correspondingly large increase in the viscosity of the polymeric composition. This is attributed in part to the slightly greater apparent smoothness of the conductive polymer coated carbon black particles as compared to the uncoated particles. The coating of the particles may fill some of the minor surface features of the carbon black particles thus providing a smoother, less voidy filler material.

In accordance with the present invention, the amount of filler material incorporated in a suitable matrix polymer can be varied to provide the resulting electrically conductive polymeric compositions with a conductivity ranging from $10^{-10}$ S/cm to 10 S/cm and preferably from $10^{-10}$ S/cm to $10^{-4}$ S/cm. The amount of filler material incorporated in these conductive polymeric compositions can range from about 0.5 wt % to about 60 wt % of the weight of the conductive polymeric compositions and is dependent upon the final use of the article fabricated of the composition. More typically, the amount of filler material incorporated in the conductive polymeric compositions is from 3 wt % to 15 wt % of the total composition weight. For example, when the compositions of the present invention are utilized to fabricate low static floor mats for use in electronic assembly areas, the compositions will typically incorporate from 3 wt % to 4 wt % filler material of conductive polymer coated carbon black particles. Electrically conductive compositions useful in the fabrication of housings for computers and other electronic equipment preferably incorporate from 15 wt % to 20 wt % conductive polymer coated carbon particles. For purposes of preparing chemical transport lines in accordance with the present invention, the electrically conductive polymeric compositions preferably include from 4 wt % to 6 wt % conductive polymer coated carbon black particles and have conductivities ranging from about $10^{-5} - 10^{-4}$ S/cm when measured by a standard four point surface conductivity probe.

Typically, combining thermoplastic polymers with filler material prepared according to the present invention is performed at elevated temperatures which are near or at the thermoplastic polymer softening temperature. Typically the formulation procedure includes sufficient agitation to provide an homogeneous mixture of filler material and thermoplastic polymer. Once combined the homogeneous mixture can be pelletized into small cylindrically shaped pellets for processing into final formed product.

When the conductive polymeric compositions of the present invention include thermoset matrix polymers the prepolymer, resinous material, or monomers can be combined with conductive filler material in a similar manner. This results in a mixture of resin prepolymer or monomer and carbon black particles having a coating of conductive polymer. Since the resinous or prepolymer material is generally liquid or a very high viscosity semi-solid, the filler material can be incorporated often into the resin with suitable agitation without adding heat, to form a homogeneous mixture. The formulated mixture can then be cast or molded into the shape of a final product and polymerized. Depending upon the type of thermoset polymer utilized to form the electrically conductive apparatus, the final polymerization may require the addition of heat.

As discussed above, preferred exemplary embodiments of the present invention include electrically conductive polymeric compositions useful for the fabrication of chemical transport devices. More particularly, nylon compositions incorporating filler material of polyaniline tosylate or polyaniline n-decyldiphenylether disulfonate coated carbon black particles are suitable for fabricating fuel lines or similar conduits for transporting volatile and flammable chemicals. Electrically conductive nylon compositions of the present invention utilized in these applications include nylon 12 incorporating from approximately 1 wt % to approximately 10 wt % filler material of conductive polyaniline n-decyldiphenylether disulfonate coated carbon black particles. Preferably the compositions incorporate from 4 wt % to 6 wt % conductive polyaniline coated carbon black particles.

Exemplary conductivities of these electrically conductive nylon compositions range from approximately $10^{-10}$ S/cm to approximately $10^{-1}$ S/cm with the preferred conductivity being about $10^{-8}$ to $10^{-5}$ S/cm.

An exemplary procedure for preparing electrically conductive nylon 12 fuel lines can be described as follows. Six pounds of conductive polyaniline coated carbon black particles prepared according to the in situ preparation procedures described herein are transferred to a high intensity mixer. While mixing, 94 pounds of compounded nylon 12 is added to the coated carbon black particles in the high intensity mixer. The combination of nylon 12 and conductive polyaniline coated carbon black particles is mixed in the high speed mixer near the melting temperature of the nylon 12 until homogeneous. The homogeneous mixture is then cooled and transferred to the hopper of a 1½" extruder with vented barrel and screw and a multi hole die assembly. The homogeneous mixture is then heated to a temperature sufficient to melt the nylon and extrude it through a die into a water bath. The extrudate is then pelletized into pellets sized about ⅛" diameter and 3/16" long.

To extrude tubing suitable for forming fuel lines the pellets are pre-dried at 212° F. for 12 hours in a vacuum oven and then placed in the hopper of a suitably sized extruder. The injection speed, pressure, screw speed and temperature profile are dependent upon the desired tubing outer diameter and inner diameter. The resulting fuel line has a conductive filler material content of 6 wt % and a conductivity of about $10^{-6}$ S/cm.

The chemical transport devices are typically lines or transportation conduits which vary in length from a few inches to many feet. However, it is also contemplated as being within the scope of the present invention to provide additional parts of chemical transport devices such as filters and valves formed of conductive polymeric compositions of the present invention. When utilized in connection with the transport and storage of chemicals, especially fuels and other volatile substances, the electrically conductive chemical transport devices of the present invention reduce the risk of catastrophic explosions and fires caused by electrical charge build-up and subsequent sparking. Moreover, the filler material which forms the basis of the conductive properties of the chemical transport devices is not susceptible to diminished or lost conductivity caused by the adsorption or reaction of the carbon black particle surface with substances in the environment. In fact, when subjected to standard sour gas evaluation procedures designed by the automotive industry to determine the chemical and principal stability of materials in harsh environments, the compositions of the present invention have greater stability than polymeric compositions incorporating uncoated carbon black particles. These improved mechanical and conductivity properties are attributed to the coating of conductive polymer formed on the surface of the carbon black particles.

Furthermore, the thin conductive polymer coating actually improves the ability of the carbon black particle filled polymeric composition to dissipate static charge. The basis for this improved capability is an increased interaction between the carbon black particles themselves as a result of the thin coating. Since the conductive polymeric coating is softer than the relatively hard uncoated carbon black particles, the contact points between coated carbon black particles have increased malleability. This increased malleability results in increased surface area at the contact points, and thus an overall increase in the physical interaction between coated carbon black particles and an increase in the conductivity of the chemical transport device.

The organic matrix polymers utilized in the chemical and fuel transport devices of the present invention are preferably nylons having a substantial degree of resistance to attack by the chemicals and fuels coming into contact with the matrix polymer. However, it is contemplated as being within the scope of the present invention to utilize any of a wide variety of polymers having physical and chemical properties suitable for exposure to selected fuels and chemicals including those thermoplastics and thermosets mentioned above.

Thus for example chemical transport devices including but not limited to fuel filters, fuel line valves, and generally tubular conduits are suitably fabricated according to the present invention by incorporating conductive polyaniline coated carbon black particles into a matrix polymer selected from the group consisting of nylon, polyethylene, polypropylene, polyetheramides, teflon, epoxies, polyesters, acrylonitrile butadiene styrene, polyurethanes and polystyrene.

It is further contemplated as being within the scope of the present invention to provide processes for transporting fuels and chemicals. Typically, transporting processes involve moving fuels from one holding area to another over distances which vary from a few feet to miles. Processes for transporting fuels and chemicals include the steps of providing a chemical transport line formed of an electrically conductive polymeric composition of the present invention and causing the chemicals and fuels to flow through the chemical transport line. Advantageously, when transporting volatile chemicals and fuels according to the present invention, the risk of catastrophic explosions and fires caused by static discharge is eliminated or substantially reduced.

The following examples are offered as being illustrative of the principles of the present invention and not by way of limitation.

EXAMPLE 1

Carbon black was dispersed, deaggregated and coated using in situ polymerization techniques and a dispersing surfactant which is also a suitable dopant for polyaniline. The dispersing and coating procedure was as follows. A solution of 0.73 grams of dianiline in 10.6 mL acetic acid was charged into a 2L reaction flask. Then 64 grams of XE-2 carbon black was wetted with 16 mL acetic acid followed by the addition of 370 mL of water.

After the carbon black was wetted by the acetic acid/water solution it was combined with 10.7 grams aniline and 270 mL of 1N decyldiphenylether disulfonic acid (CALFAX 10LA - 40 from PILOT Chemical Co.) and charged into the 2L reaction flask. The mixture was agitated for 1 hour and a first sample was taken for particle size analysis. After 1.5 hours of agitation a second sample was taken. Then an ultrasonic probe was immersed in the mixture. Samples were intermittently taken for particle size analysis over a 4.5 hour period of time. During this time the average particle size remained between 0.13–0.15 microns.

Following the above described dispersing step, 25.4 grams of ammonium persulfate was added to the flask over a 20 minute period while maintaining the temperature of the flask contents at 5° C. After 20 minutes of stirring 5 grams of sodium sulfite in 25 mL of water was added to the flask. A particle size analysis of the coated carbon black before filtering the coated particles indicated that the particles had an average size of 0.41 microns. The coated particles were then collected by both filtration and centrifugation and washed with acetone on a buchner funnel. The above procedure illustrated the successful preparation of carbon particles which were dispersed and coated using the same disulfonic acid.

EXAMPLE 2

Conductive polyaniline coated carbon particles were prepared according to the following procedure. XE-2 carbon filler material was pre-wet by adding 640 grams of the carbon particles to 159 mL of acetic acid followed by the addition of 8.7L of deionized water. The slurry of carbon particles, acetic acid and water was stirred until the carbon particles were well dispersed and wet.

In a separate reaction container equipped with an ice bath, nitrogen inlet, solids addition funnel and condenser/outlet bubbler, 7.30 grams of dianiline was dissolved in 106 mL of acetic acid. Then 2.7L of 1N p-toluene sulfonic acid monohydrate and 106.62 grams of aniline were added to the dianiline solution. Finally the slurry of acetic acid, water, and carbon was added to the dianiline, aniline and p-toluene sulfonic acid monohydrate solution while rinsing the slurry container with deionized water. This reaction mixture was cooled to 5° C. by maintaining an external dry ice bath between −5° C. and −10° C.

Then a total of 253.78 grams of ammonium persulfate was added gradually to the cooled reaction mixture while maintaining the reaction mixture at 5° C.–10° C. Once all the oxidant was added the reaction mixture was stirred for 20 minutes at 5° C.–10° C. After the 20 minute stirring period, a solution of 50.28 grams of sodium sulfite ($Na_2SO_3$) in 250 mL of deionized water was added to the reaction mixture and stirred for 10 minutes.

To work up and recover the conductive polyaniline coated carbon particles, the solids were retrieved from the reaction mixture by filtering the product on a buchner funnel using #2 filter paper. The resulting filter cake was rinsed with 2L of aqueous 1.0N p-toluene sulfonic acid solution, 2L of deionized water, 2L of isopropyl alcohol, and 43L of acetone. The rinsed solid product was then dried in a vacuum oven under full vacuum at 50° C.

EXAMPLE 3

A thin coating of self-doped sulfonated polyaniline was formed onto the surface of highly dendritic carbon black particles according to the following procedure. First, 0.30 grams of sulfonated polyaniline were stirred in 3.0 mL of concentrated (28%) aqueous ammonia. After the sulfonated polyaniline was completely dissolved in the ammonia, 1.2 grams of XE-2 carbon black and 30 mL of aqueous ammonia were added to the ammonia and sulfonated polyaniline solution and stirred until the carbon black was well dispersed.

Heat was added to the carbon black, ammonia and sulfonated polyaniline system until the temperature reached 60° C.–70° C. and a vacuum was applied to the system. Thus, the ammonia was driven from the water, reducing the pH and causing the sulfonated polyaniline to precipitate onto the surface of the carbon black particles. The pH dropped to between 7 and 8.

Finally, the coated carbon black particles were collected by filtering and then washed with water, isopropyl alcohol, and acetone. The final coated carbon black was heated and oven dried to provide carbon particles having a coating of sulfonated polyaniline. A pellet weighing 0.152 grams and having a thickness of 1442 microns was prepared and its conductivity determined using a standard 4 point probe conductivity measuring technique. The measured conductivity was 23.4 S/cm.

EXAMPLE 4

In order to test the thermal stability and physical integrity of a composition of the present invention, a sample of VULCAN XC-72 carbon from Cabot Corp. was coated with conductive polyaniline according to the method described in Example 1. Then a pellet was pressed from 0.2425 grams of the coated carbon in a pellet press at 9000 psi to give a disk having a thickness of 2054 microns. The conductivity of the pellet was determined to be 12.4 S/cm using a Loresta 4-point probe conductivity/resistance meter. A gram of the conductive coated carbon particles from the same batch was then heated to 160° C. in air in an oven for 30 minutes. A pellet having a thickness of 2333 microns was pressed from 0.2881 grams of this material. This pellet had good mechanical integrity and a conductivity of 12.0 S/cm as determined by the Loresta conductivity meter which corrects internally for variations in sample geometry. A third gram of the coated XC-72 carbon particles from the same batch was exposed to 180° C. for 30 minutes and then pressed to a pellet. This pellet had good mechanical integrity and a conductivity of 12.0 S/cm. A final gram of the above described conductive composition was exposed to 200° C. for 30 minutes and then pressed to a pellet at 9000 psi. This pellet had good mechanical integrity and a conductivity of 11.7 S/cm. This example demonstrates both the quality of the coating of an XC-72 particle at 20 weight percent polymer and the excellent thermal stability of the polyaniline decyldiphenylether disulfonate coated composition.

EXAMPLE 5

XE-2 carbon particles, having a surface area of 1000 $m^2/gm$ were coated with conductive polyaniline according to the method of Example 1. The resulting composition was pressed at 9000 psi to form a pellet. The conductivity of the pellet was determined to be 24.0 S/cm using a Loresta 4-point probe conductivity/resistance meter. A portion of the above described composition was heated to 160° C. in air in an oven for 30 minutes. A pellet was pressed from a portion of this material after it had cooled to room temperature. The pellet had a conductivity of 21.5 S/cm but cracked during testing of the conductivity. Portions of the same coated carbon particles treated at 180° C. and 200° C., which were pressed into pellets behaved similarly.

EXAMPLE 6

XE-2 carbon particles from Degussa Corporation having a surface area of 1000 $m^2/gm$ were coated with conductive polyaniline according to the method of Example 1. However, the coating process differed from that of Example 1 in that the conductive polymer coating represented 50 weight percent of the composition. The resulting conductive composition was then treated according to the procedures outlined in Example 5. The pellet, which was formed without a heat treatment had a conductivity of 8.1 S/cm. The pellet which was formed following a 160° C. heat treatment had a conductivity of 4.5 S/cm and good mechanical integrity. Finally, pellets which were formed following 180° C. and 200° C. treatments had good mechanical integrity and conductivities of 4.8 S/cm and 5.3 S/cm respectively. From the foregoing description it is clear that carbon particles having surface areas in the range of 1000 $m^2/gm$ are sufficiently coated with 50 wt % conductive polymer.

EXAMPLE 7

High surface area carbon particles (XE-2) were coated with conductive polyaniline according to the procedure of Example 1 except that toluene sulfonic acid was utilized instead of decyldiphenylether disulfonic acid. The resulting conductive composition had a carbon particle coating weight of 20 wt % conductive polymer. Samples of this composition were treated and formed into pellets as described in Example 5. The pellet which was formed without heat treatment had a conductivity of 19.23 S/cm. Pellets prepared from the conductive composition after exposure for 30 minutes at 160° C., 180° C., and 200° C. showed conductivities of 24.3 S/cm, 18.8 S/cm, and 22.3 S/cm respectively. However, all of the pellets prepared from the heat aged samples cracked readily. The results of these experiments demonstrate that high surface area carbon particles should be coated with greater than 20 wt % polyaniline tosylate in order to have optimum properties for use at high temperatures.

EXAMPLE 8

The following example demonstrates the utility of an acidic dopant which can also serve as a surfactant for dispersing and deaggregating carbon particles. The carbon particle deaggregation step includes preparing a solution of 0.73 grams of p-dianiline in 10.6 mL of glacial acetic acid and charging this solution into a 2000 mL round bottom flask equipped with a teflon paddle mechanical stirrer, a thermometer, and $N_2$ atmosphere. This was followed by adding 270 mL of an aqueous 1.0N n-decyldiphenylether disulfonic acid solution to the round bottom flask. Then 10.7 grams of aniline were added to this solution. Then 64 grams of carbon (Black Pearl 2000, Cabot corporation) were wetted with 16 mL of acetic acid followed by slowly adding 870 mL of water to form an aqueous carbon black slurry. This slurry was added to the 2000 mL reaction flask and rinsed in with 100 mL of deionized water. Agitation was continued under a $N_2$ blanket. After 5 days of agitation the aggregates of carbon particles had broken down to a median particle size of 0.15 microns as measured by a sedimentation type particle size analyzer.

EXAMPLE 9

The procedure of example 8 was repeated except that a 1.0N solution of p-toluene sulfonic acid was used instead of the 1.0 N solution of n -decyldiphenylether disulfonic acid. This mixture was agitated for 14 days. After 14 days aggregates of carbon were still visible to the naked eye indicating poor dispersing ability of the p-toluene sulfonic acid as compared to the n-decyldiphenylether disulfonic acid described in Example 8. This experiment demonstrates the superior ability of n-decyldiphenylether disulfonic acid to disperse and deaggregate carbon particles.

EXAMPLE 10

An electrically conductive composition of carbon particles having a coating of sulfonated polyaniline was prepared by dissolving 0.30 grams of sulfonated polyaniline in 3 mL of 30% aqueous ammonia to give a dark blue solution. This solution was added to 1.2 grams of deaggregated XE-2 carbon particles slurried in 30 mL of 30% aqueous ammonia. This mixture was heated at 60°–70° C. for 3 hours under approximately 28 inches of vacuum. The resulting slurry of carbon particles having a coating of sulfonated polyaniline was then filtered and washed with water. The water wash was slightly brown. This was followed by washes with isopropyl alcohol and acetone. These washes were clear. The carbon powder was dried overnight under vacuum at 50° C. A pellet pressed from 0.1518 grams of the powder had good mechanical integrity and a conductivity of 23.4 S/cm.

EXAMPLE 11

Conductive polyaniline coated carbon particles were prepared by causing presynthesized polyaniline to precipitate onto the surface of carbon particles according to the following procedure. A solution of 1.07 grams of polyaniline free-base in 10 mL of N-methylpyrrolidinone was prepared, followed by the addition of 5.35 grams of XE-2 carbon black, forming a paste. 75 mL of N-methylpyrrolidinone was added to the paste and the resulting slurry was stirred until the carbon was wetted. Then 50 mL of methanol was added dropwise to the slurry followed by 100 mL of water which was also added dropwise. At this point a small sample of the slurry was collected and allowed to settle. The supernatant was colorless indicating that the polymer had been adsorbed onto the surface of the carbon. The coated carbon particles were then filtered on a buchner funnel. The filter cake was then dispersed in 400 mL of aqueous 1.0N p-toluene sulfonic acid with vigorous stirring for 30 minutes. This slurry was then filtered and the filter cake was washed with 1.0N p-toluene sulfonic acid, isopropyl alcohol, and finally with acetone. The filtrate was colorless. The filter cake was broken-up, placed in a vacuum oven and dried overnight at full vacuum and 50° C. A pellet pressed from this coated powder had a conductivity of 19.7 S/cm.

Typically, as the loading of polymeric matrices with carbon black increases a degradation in mechanical properties is observed. However, the use of conductive polymer coated carbon black as a filler in accordance with the present invention improves the mechanical properties of the filled polymeric matrices so that sufficient loading to achieve the desired conductivities can be utilized Without adversely affecting the mechanical properties. The following Example illustrates the effect on mechanical properties of various fillers.

EXAMPLE 12

Nylon 12 (L-2124 Vestimid Nylon 12 available from HULS) samples, carbon black (VULCAN XC-72 carbon black available from Cabot Corp.) filled Nylon 12 samples, and conductive polyaniline coated carbon black filled Nylon 12 samples using polyaniline coated carbon black particles prepared in accordance with Example 4 were tested in the form of injection molded dogbone shaped tensile bars for elongation following exposure to peroxide enriched gasoline at 60° C. for 30 days. Testing was conducted at room temperature using an Instron tensile measuring system at a rate of 50 mm/min. The elongation was recorded at the point at which microcracking was first observed.

The results are shown in Table 1.

TABLE 1

| SAMPLE | % ELONGATION | % ELONGATION vs. PURE NYLON 12 |
|---|---|---|
| Pure Nylon 12 | 315.0 | 100 |
| 4% of carbon black added to Nylon 12 | 266.7 | 84.66 |
| 5% of carbon black added to | 271.7 | 86.24 |

TABLE 1-continued

| SAMPLE | % ELONGATION | % ELONGATION vs. PURE NYLON 12 |
|---|---|---|
| Nylon 12 6% of carbon black added to Nylon 12 | 265.0 | 84.13 |
| 7% of carbon black coated with conductive polymer added to Nylon 12[1] | 283.0 | 89.84 |
| 7% of XC-72R coated with polyaniline conductive polymer added to Nylon 12[2] | 289.0 | 91.75 |

[1] Average temperature of compounding Nylon 12 with conductive polymer coated carbon black, 228° C., screw speed 300 rpm.
[2] Average temperature of compounding Nylon 12 with conductive polymer coated carbon black, 235° C., screw speed 303 rpm.

The results given in Table 1 show that the mechanical strength of filled polymeric matrices is enhanced appreciably by use of conductive polymer coated carbon black fillers, even at substantially elevated loadings.

The foregoing detailed description is to be clearly understood as given by way of illustration and example only, the spirit and scope of this invention being limited solely by the appended claims.

What is claimed is:

1. An electrically conductive polymeric composition comprising:
   at least one nonconductive matrix polymer and incorporated in said matrix polymer an electrically conductive filler material in an amount of 0.5 wt % to 60 wt % of the electrically conductive polymeric composition sufficient to provide said polymeric composition with an electrical conductivity of at least $10^{-10}$ S/cm, said electrically conductive filler material comprising carbon black having an aspect ratio of about 1 coated with an intrinsically electrically conductive polymer.

2. The electrically conductive polymeric composition of claim 1 wherein said intrinsically electrically conductive polymer comprises about 5 wt % to 50 wt % of said electrically conductive filler material.

3. The electrically conductive polymeric composition of claim 1 wherein said intrinsically electrically conductive polymer is selected from the group consisting of polyacetylene, polyphenylene, polyphenylenevinylene, polypyrrole, polyisothianaphthene, polyphenylene sulfide, polythiophene, poly (3-alkylthiophene), polyazulene, polyfuran, and polyaniline.

4. The electrically conductive polymeric composition of claim 3 wherein said intrinsically electrically conductive polymer is polyaniline and said polyaniline incorporates a protonic acid dopant.

5. The electrically conductive polymeric composition of claim 1 wherein the coated carbon black includes coated aggregates of carbon black.

6. An electrically conductive polymeric composition comprising:
   a matrix polymer selected from the group consisting of nylons, polyethylene, polypropylene, polyvinylchloride, polyetheramides, polyetherimides, polyethersulfones, polyetherketones, teflons, epoxies, polyesters, acrylonitrile butadiene styrene, polyurethanes, ethylene vinyl acetate, polystyrene, and silicones; and
   incorporated in said matrix polymer about 3 wt % to 20 wt % of electrically conductive filler material, said electrically conductive filler material comprising carbon black particles coated with an intrinsically electrically conductive polymer, said intrinsically electrically conductive polymer being a conductive polyaniline.

7. The electrically conductive polymeric composition of claim 6 wherein said intrinsically electrically conductive polymer comprises about 5 wt % to 50 wt % of said filler material.

8. The electrically conductive polymeric composition of claim 6 wherein said conductive polyaniline incorporates a protonic acid dopant.

9. The electrically conductive polymeric composition of claim 8 wherein said protonic acid dopant is selected from the group consisting of HX, $H_2SO_4$, $H_3PO_4$, $R(COOH)_n$, $R'(COOH)_n$, $R(SO_3H)_n$, $R(PO_3H)_n$, $R'(SO_3H)_n$, and $R'(PO_3H)_n$, wherein X is a halogen, R is hydrogen or a substituted or unsubstituted alkyl moiety, R' is a substituted or unsubstituted aromatic moiety, and n is an integer $\geq 1$.

10. The electrically conductive polymeric composition of claim 8 wherein said protonic acid dopant is selected from the group consisting of methane sulfonic acid, benzene sulfonic acid, toluene sulfonic acid, and an acid having the formula $HO_3SR'—O—R''SO_3H$ wherein R' and R" are independently substituted or unsubstituted aromatic moieties, said substitutions being selected from the group consisting of halogen, alkyl, and alkoxy.

11. The electrically conductive polymeric composition of claim 8 wherein said protonic acid dopant has the formula:

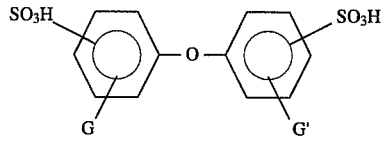

wherein G and G' are independently hydrogen, lower alkyl, octyl, nonyl, or saturated or unsaturated linear or branched decyl, dodecyl, tetradecyl, hexadecyl, or octadecyl groups.

12. The electrically conductive polymeric composition of claim 11 wherein said protonic acid dopant is selected from the group consisting of decyl diphenylether disulfonic acid and decylphenylether disulfonic acid.

* * * * *